United States Patent [19]

Dolan

[11] Patent Number: 4,604,908

[45] Date of Patent: Aug. 12, 1986

[54] TRANSFER CASE PLANETARY WITH POWER TAKE-OFF

[75] Inventor: Courtney F. Dolan, Syracuse, N.Y.

[73] Assignee: Chrysler Corporation, Highland Park, Mich.

[21] Appl. No.: 662,104

[22] Filed: Oct. 18, 1984

[51] Int. Cl.$^4$ .......................... F16H 37/8; F16H 3/44; F16H 57/10

[52] U.S. Cl. .................... 74/15.88; 74/785; 74/788; 74/15.8

[58] Field of Search ............... 74/785, 788, 15.88, 74/15.86, 15.84, 15.82, 15.8, 606 R

[56] References Cited

U.S. PATENT DOCUMENTS

| | | | |
|---|---|---|---|
| 2,636,390 | 4/1953 | Wagner | 74/15.86 |
| 2,749,756 | 6/1956 | George | 74/15.86 |
| 2,933,928 | 4/1960 | Wagner | 74/15.86 |
| 2,960,880 | 11/1960 | Wagner | 74/15.86 |
| 3,845,671 | 11/1974 | Sharp et al. | 74/710.5 |
| 4,440,042 | 4/1984 | Holdeman | 74/785 |

Primary Examiner—Kenneth J. Dorner
Assistant Examiner—Mike Bednarek
Attorney, Agent, or Firm—Edward P. Barthel

[57] ABSTRACT

A power take-off arrangement for a vehicle four-wheel drive transfer case. The transfer case housing end wall supports an annulus gear concentrically about the input shaft. The input shaft terminates in an end axial flange portion defining a sun gear of a helical planetary gear assembly. The inboard carrier ring includes peripheral power take-off gear teeth. The carrier rings are journalled on the opposed shoulders of the end axial flange portion. The carrier ring peripheral gear teeth are adapted to mesh with a power take-off input gear extending through an aperture in the housing side wall providing power take-off when the transfer case is driven in any of its various driving modes.

1 Claim, 1 Drawing Figure

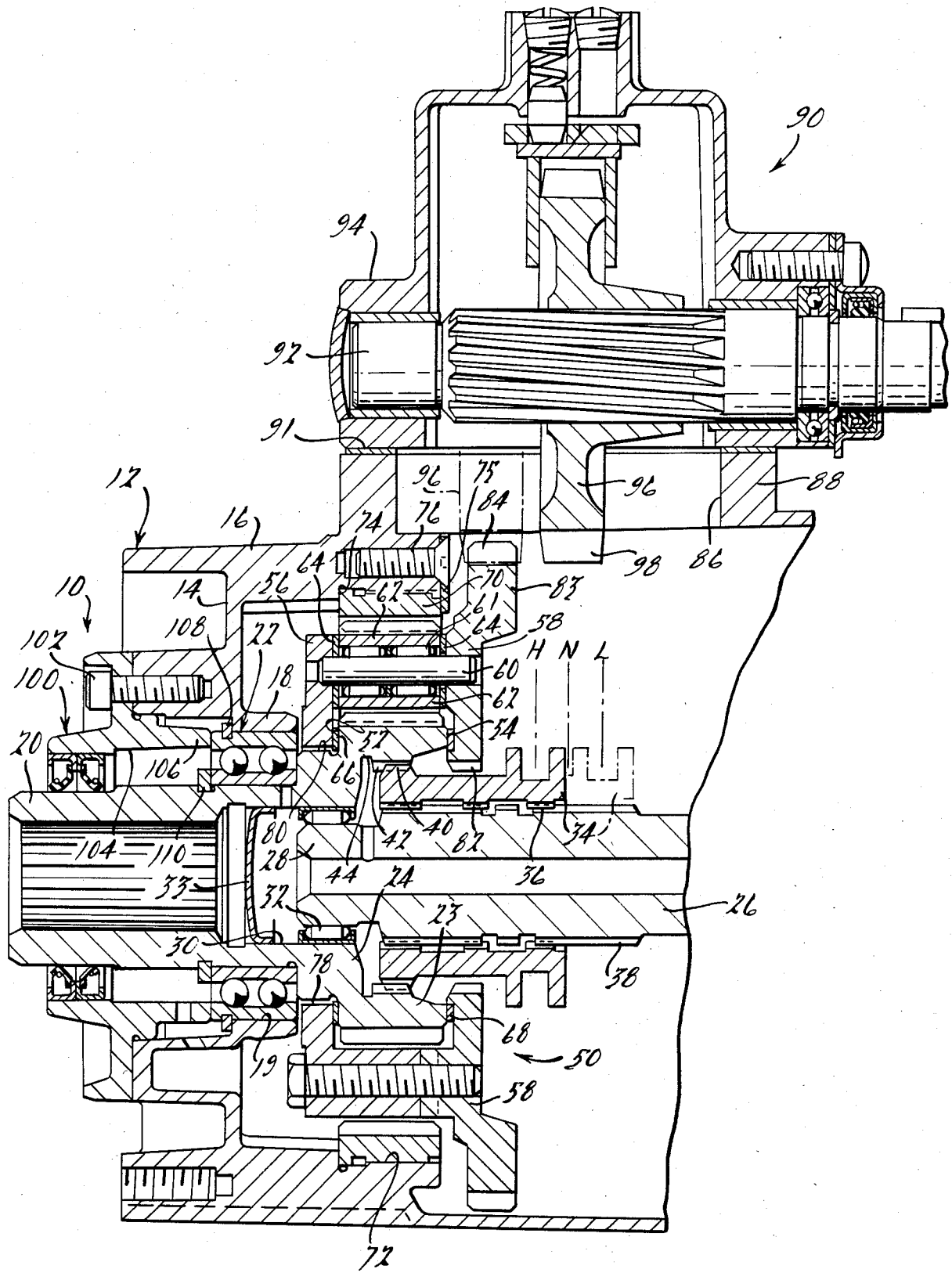

TRANSFER CASE PLANETARY WITH POWER TAKE-OFF

BACKGROUND OF THE INVENTION

This invention relates to a transfer case for four-wheel drive vehicles and more particularly to a power take-off arrangement for a helical planetary gear assembly within the transfer case.

It is a desirable option to provide a power take-off arrangement for a transfer case which is readily accessible and compact. In the prior art it has heretofore been the practice to mount a separate power take-off gear on the input shaft of the transfer case. Such an arrangement requires extensive redesign of an existing transfer case including an extension of the input shaft and housing to accommodate the power take-off gear. Space limitations may make such design adjustments impractical or financially prohibitive.

SUMMARY OF THE INVENTION

Briefly, this invention comprises a transfer case adapted for use on a four-wheel drive vehicle having two-wheel drive and four-wheel drive operating modes. The transfer case provides a power take-off option incorporated in a planetary gear assembly. An example of a non-sliding helical planetary gear assembly for a vehicle transfer case is shown in U.S. Pat. No. 4,440,042 issued Apr. 3, 1984 to Holdeman.

It is a primary object of this invention to provide a transfer case of the class described which uses a portion of the planetary pinion gear carrier as the power take-off gear means. This arrangement takes advantage of having a constantly rotated planetary carrier when the transfer case is driven in any of its various driving modes.

Another object of this invention is to provide a vehicle transfer case power take-off for a helical planetary gear assembly incorporating a sun gear integral with the input shaft to axially align the planet carrier rings during their rotation in the various driving modes.

Another advantage of the invention is to provide a power take-off arrangement for a vehicle transfer case which results in a reduced overall axial dimension of the gearing.

Other objects and advantages of the invention will be made apparent as the description progresses.

DESCRIPTION OF THE DRAWINGS

In the accompanying drawing there is shown a fragmentary sectional view of a portion of a transfer case showing a helical planetary gear assembly adapted to engage a power take-off adapter gear.

DESCRIPTION OF THE PREFERRED EMBODIMENT

Referring now to the drawings, a portion of a transfer case constructed in accordance with the invention is generally indicated at 10. A description of one type of a vehicle transfer case may be found in U.S. Pat. No. 3,845,671 assigned to a common assignee. As shown in the drawing a transfer case housing 12 includes an end wall 14 with a side wall 16 extending therefrom in one axial direction.

The end wall has an annular hub portion 18 formed therein having an axial bore 19 supporting an input shaft 20 therein by journal means in the form of a double row angular contact ball bearing assembly 22. The input shaft 20 terminates in an outwardly stepped integral end axially extending flange portion 23 joined by an intermediate stepped radially extending flange portion 24 to the input shaft 20. An output shaft 26 is aligned on the longitudinal axis of the input shaft 20 and has a pilot 28 received in input shaft bore 30 by needle bearings 32. An end plug 33 closes the bore 30. The output shaft 26 has a clutch collar 34 axially slidable thereon by means of collar internal splines 36 engaged with output shaft external splines 38.

The clutch collar 34 has external clutch teeth 40 shown slidably engaged with internal clutch teeth 42 in axial counter-bore 44 formed in the end of the input shaft 20. Torque is transferred directly from the input shaft 20 through the engaged teeth 40,42 and the collar internal splines 36 to the external splines 38 of the output shaft 26, thereby establishing the direct high range drive mode "H".

The input shaft axial flange portion 23 defines a helical sun gear of a helical planetary gear assembly generally indicated at 50. The end axial flange portion or sun gear 23 defines oppositely facing radially extending annular shoulders 52 and 54. A planetary carrier is provided including first and second axially spaced ring members 56 and 58, respectively. The ring members are joined by a pluraltiy of circumferentially spaced pins that form axially extending planet pinion shafts 60. Journalled on double rows of needle bearing 61 for rotation on the shafts 60 are helical planet pinion gears 62. Washers 64 are provided on the shafts 60 between the pinion gears 62 and the ring members 56,58 acting to axially align the pinion gears. Bearings 66,68 in contact with the respective inner surface of the rings 56,58 and transverse shoulders 52,54 act to axially locate and align the rotating carrier assembly.

A helical annulus gear 70 is mounted via a splined press-fit on the inner surface of the housing cylindrical wall 16. In the embodiment shown the wall means 16 includes a stepped counterbore 72 which receives and axially seats in a press-fit manner the annulus gear 70 on its stop shoulder 74. The annulus gear 70 is additionally positively retained against inward axial movement away from the stop shoulder 74 in the disclosed form by means of a plurality of retaining tabs 75 each fixed to the housing by a machine screw 76. In an alternate annulus gear positive retaining method (not shown) a free end portion of the wall 16 could be rolled-over into an annular external notch formed in the annulus gear. Also, it is contemplated that in one form a snap-ring could be used to insure positive retention of the annulus gear against axial thrust loads resulting from the helical gear teeth of the planetary gear assembly 50.

The carrier outboard ring 56 has an interior bearing surface 78 engaging exterior bearing surface 80 on radial flange portion 24. Thus rotatable movement of the carrier ring 56 relative to the input shaft surface 80 allows the pinion gears 62 to float radially for optimum tooth bearing engagement with the ring gear 70 and the sun gear 23.

The carrier inboard ring 58 includes internal spur gear teeth 82 formed thereon. The inboard ring internal teeth 82 may be placed in sliding engagement with the clutch collar teeth 40 when the collar 34 is moved axially to the right into low range position "L" indicated in dashed lines.

The outer end of carrier ring 58 has an integral axial offset ring gear portion 83 which extends radially beyond the annulus gear 70 and has its outer periphery formed with spur gear teeth 84. A portion of the housing side wall 16 is adapted to be removed providing an access rectangular opening or aperture 86 aligned radially outwardly from the carrier ring gear teeth 84. The aperture 86 in the housing sidewall is defined by suitable mounting means such as peripheral rectangular frame 88.

A conventional power take-off gear box assembly generally indicated at 90, is adapted to be mounted on the frame member 88 such as by bolts (not shown). Seal means 91 are provided between the frame and the apparatus 90 for sealing therebetween during operation. The gear box 90 includes a longitudinally extending take-off shaft 92 journalled in case 94 with the shaft positioned parallel with the transfer case input 20 and output 26 shafts. The shaft 92 has a power take-off spur gear 96 slidably mounted thereon for rotation therewith. The gear 96 is sized such that its gear teeth 98 extend radially through the aperture 86 and are positioned to slidably mesh with carrier teeth 84. Thus, the spur gear 96 is adapted to be shifted axially on shaft 92 to its left dashed line position for driven engagement with the carrier gear teeth 84.

It will be seen that the housing 12 also includes a removable end cap 100 fitted on the end wall 14 by means of a plurality of machine screws 102. The end cap 100 has a central opening 104 receiving the input shaft 20 and an inner annular portion 106 abutting one end of the ball bearing assembly 22 for retention against axial outward movement. A snap ring 108, located in a annular groove of the ball bearing assembly outer race, retains the assembly against inward axial movement. A snap ring 110 is also provided in an annular output shaft groove to locate the shaft against the inner race of the ball bearing assembly. Thus, the input shaft 20 is readily and accurately aligned in the housing by means of the single ball bearing assembly. Also, the construction allows the bearing assembly to be easily serviced or replaced by removing the end cap 100 and the snap rings 108 and 110.

Applicant's invention provides a compact power take-off arrangement from the planetary carrier. The radially floating carrier enables the carrier teeth 84 to absorb gear teeth stresses during operation. Also the unique design achieves a reduced overall axial dimension of the transfer case gearing assembly by eliminating a separate power take-off gear.

While a specific embodiment of the invention has been shown and described in detail to illustrate the application of the principals of the invention, it will be understood that the invention may be embodied otherwise without departing from such principals.

What is claimed is:

1. In a transfer case apparatus including a housing having an end wall defining an axial opening; said housing having outer wall means extending in a first axial direction from said end wall, axial bearing means journally supporting an input shaft in said end wall opening, said input shaft having one end terminating within said housing in an annular end flange portion joined by an intermediate stepped radially extending flange portion, said input shaft annular end flange portion defining an integral sun gear having oppositely facing transverse extending shoulders, an output shaft journally supported in said housing, said output shaft having a clutch collar axially slidable thereon by means of collar internal splines engaged with external splines on said output shaft, said input shaft having an axial counter-bore formed on said input shaft annular end flange, internal clutch tooth formed in said input shaft counter-bore, external clutch teeth formed on said clutch collar slidably engageable with said input shaft counterbore internal teeth when said clutch collar is moved axially outboard into a high-range drive mode, a helical planetary gear assembly comprising a carrier having outward and inboard axially spaced rings defining inner opposed faces and supporting a plurality of planet gears therebetween, said outboard ring formed with an axial bore encircling said intermediate flange portion for journalled rotation thereon, external bearing means interposed between the inner opposed faces of said rings and their associated sun gear transverse shoulders whereby said planet carrier is axially aligned in a radially floating manner on said input shaft, said wall means having a counter-bore formed therein concentrically supporting an annulus gear, said annulus gear having internal helical gear teeth in meshing relation with said planetary gears, said carrier inboard ring formed with power take-off gear teeth extending radially a predetermined distance beyond said annulus gear, said outer wall means having an aperture therein radially aligned with said inboard ring power take-off gear teeth, mounting means on said outer wall means for supporting a power take-off gear box thereon including an input gear with spur teeth rotatably supported on an axially extending take-off shaft disposed parallel to said transfer case input shaft, a portion of said input gear adapted to extend through said aperture for axial travel on said take-off shaft input gear spur teeth into selective meshing engagement with said inboard ring output spur gear teeth, said inboard ring including an axial bore encircling said clutch collar, said inboard ring axial bore having internal spur gear teeth formed thereon such that when said clutch collar is moved axially inboard its external clutch teeth slidably engage said inboard ring internal spur teeth providing a low-range drive mode, whereby said carrier inboard ring operative for transmitting either a high-range or a low-range drive mode to said take-off shaft upon selective shifting of said clutch collar.

* * * * *